(12) United States Patent
Ishizaki

(10) Patent No.: US 10,020,858 B2
(45) Date of Patent: Jul. 10, 2018

(54) MULTI-INPUT MULTI-OUTPUT COMMUNICATION SYSTEM, TRANSMITTER, AND METHOD OF ASSIGNING RESOURCES THEREIN

(75) Inventor: Ryuichiro Ishizaki, Tokyo (JP)

(73) Assignee: NEC CORPORATION, Tokyo (JP)

( * ) Notice: Subject to any disclaimer, the term of this patent is extended or adjusted under 35 U.S.C. 154(b) by 495 days.

(21) Appl. No.: 12/281,501

(22) PCT Filed: Nov. 10, 2006

(86) PCT No.: PCT/JP2006/322480
§ 371 (c)(1),
(2), (4) Date: Sep. 3, 2008

(87) PCT Pub. No.: WO2007/099675
PCT Pub. Date: Sep. 7, 2007

(65) Prior Publication Data
US 2009/0054015 A1 Feb. 26, 2009

(30) Foreign Application Priority Data
Mar. 3, 2006 (JP) .................................. 2006-057618

(51) Int. Cl.
*H04B 7/06* (2006.01)
*H04B 7/08* (2006.01)
(Continued)

(52) U.S. Cl.
CPC .......... *H04B 7/0632* (2013.01); *H04W 16/10* (2013.01); *H04B 7/0452* (2013.01); *H04W 24/10* (2013.01); *H04W 72/04* (2013.01)

(58) Field of Classification Search
USPC .......................................................... 455/69
See application file for complete search history.

(56) References Cited

U.S. PATENT DOCUMENTS

2002/0090004 A1* 7/2002 Rinchiuso ..................... 370/468
2004/0032910 A1* 2/2004 Horng .................. H04B 7/0634
375/267
(Continued)

FOREIGN PATENT DOCUMENTS

| JP | 2004023716 A | 1/2004 |
| JP | 2004-201296 A | 7/2004 |

(Continued)

OTHER PUBLICATIONS

Korean Office Action for KR10-2008-7024320 dated Jun. 25, 2010.
(Continued)

*Primary Examiner* — Gennadiy Tsvey

(57) ABSTRACT

Transmitter (101) extracts CQI values representative of reception qualities measured by and transmitted from receivers (102-1 through 102-β) as representing reception states of antennas (121-1 through 121-φ) of receivers (102-1 through 102-β), from data receivers (102-1 through 102-β) and received by transmitter (101), combines the extracted CQI values depending on preset weighting coefficients, calculates resource coefficients for assigning resources for transmitting data to receivers (102-1 through 102-β) from the combined CQI values, and assigns resources for transmitting data to receivers (102-1 through 102-β) based on the calculated resource coefficients.

3 Claims, 7 Drawing Sheets

(51) Int. Cl.
*H04W 16/10* (2009.01)
*H04B 7/0452* (2017.01)
*H04W 24/10* (2009.01)
*H04W 72/04* (2009.01)

(56) References Cited

U.S. PATENT DOCUMENTS

| | | |
|---|---|---|
| 2004/0176097 A1 | 9/2004 | Wilson et al. |
| 2005/0043031 A1* | 2/2005 | Cho et al. .................. 455/450 |
| 2006/0023624 A1* | 2/2006 | Han et al. ................... 370/204 |
| 2006/0079221 A1* | 4/2006 | Grant et al. ................ 455/423 |
| 2006/0120470 A1* | 6/2006 | Hwang et al. .............. 375/260 |
| 2007/0160162 A1* | 7/2007 | Kim et al. .................. 375/267 |
| 2008/0192683 A1* | 8/2008 | Han et al. ................... 370/329 |

FOREIGN PATENT DOCUMENTS

| | | |
|---|---|---|
| JP | 2004535106 A | 11/2004 |
| JP | 2005-065242 A | 3/2005 |
| JP | 2005514801 A | 5/2005 |
| JP | 2005151567 A | 6/2005 |
| JP | 2005237006 A | 9/2005 |
| KR | 2005-20576 A | 3/2005 |
| KR | 1020050122143 * | 12/2005 |
| WO | 2003058871 A1 | 7/2003 |
| WO | 2004077778 A1 | 9/2004 |
| WO | 2004/091148 A1 | 10/2004 |
| WO | 2004102829 A1 | 11/2004 |
| WO | 2005/006700 A1 | 1/2005 |
| WO | 2005/093961 A1 | 10/2005 |
| WO | 2006006770 A1 | 1/2006 |
| WO | 2006/019253 A1 | 2/2006 |

OTHER PUBLICATIONS

International Search Report for PCT/JP2006/322480 dated Feb. 13, 2007.
International Preliminary Report on Patentability for PCT/JP2006/322480 dated Sep. 9, 2008.
Japanese Office Action for JP Application No. 2011-253740 dated Jul. 9, 2013 with Partial English Translation.
"3rd Generation Partnership Project; Technical Specification Group Radio Access Network; Multiple-Input Multiple Output in UTRA", 3GPP Standard; 3GPP TR 25.876, 3rd Generation Partnership Project (3GPP), Mobile Competence Centre , 650, Route Des Lucioles, F-06921 Sophia-Antipolis Cedex; France, No. V2.0.0, Oct. 1, 2005, pp. 1-76, XP050380485, paragraphs [5.2.4.2.3]-[5. 2. 5. 2. 5. 2 .1], [5. 2. 7. 2. 3. 2], [5.2.11.2.3]; figure 5.2.3.1.3. Cited in EP Search Report.
The Extended European Search Report for EP Application No. EP06823302.2 dated Mar. 6, 2015.
Japanese Office Action for JP Application No. 2014-252849 dated Feb. 23, 2016 with English Translation.
Japanese Office Action for JP Application No. 2014-252849 dated Sep. 15, 2015 with English Translation.
People's Republic of China Office Action corresponding to Chinese Patent Application No. 200680053694.9, dated Feb. 1, 2013.

* cited by examiner

【Fig. 1】
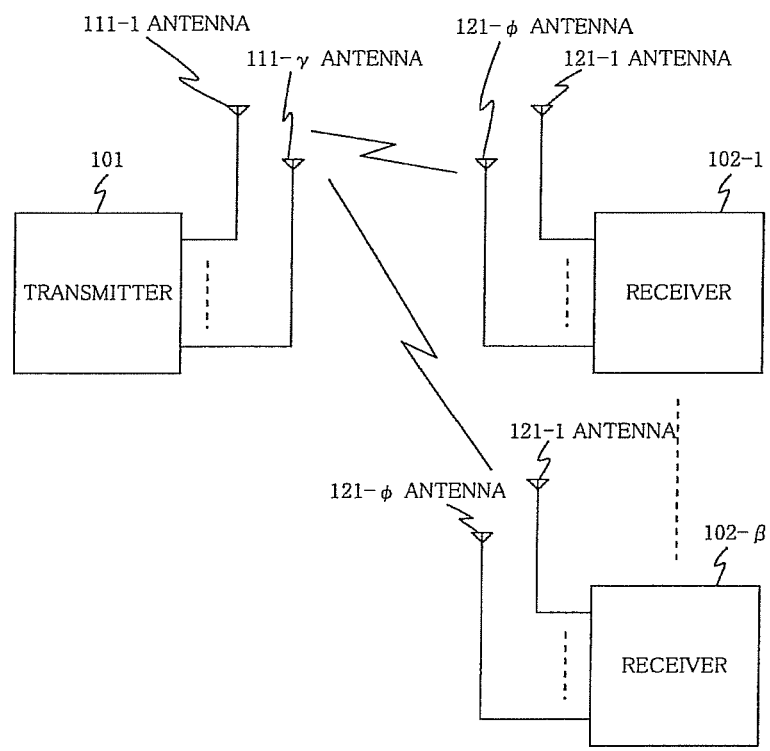

[Fig. 2]
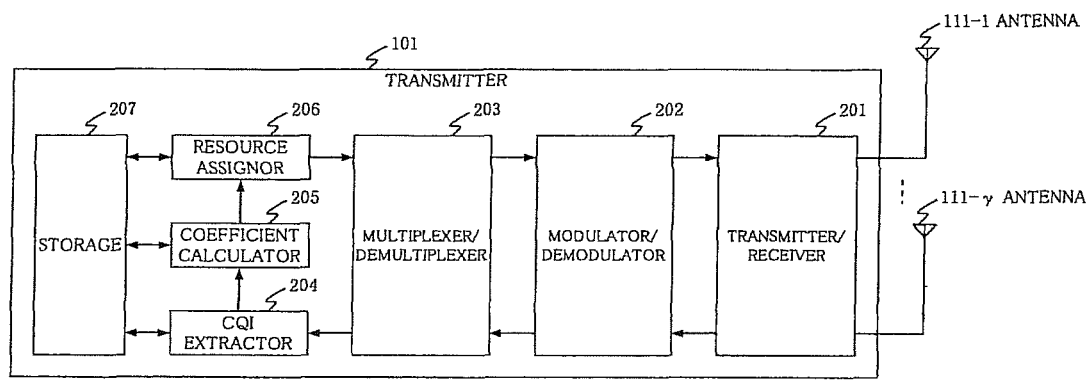

[Fig. 3]
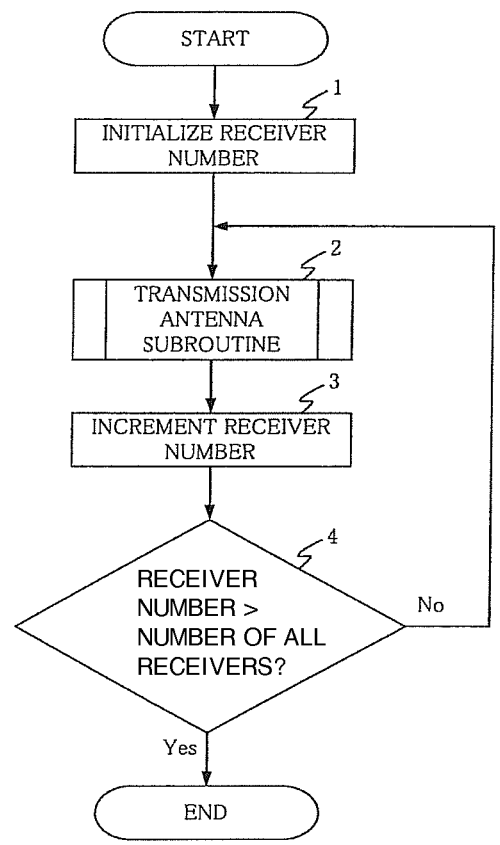

[Fig. 4]
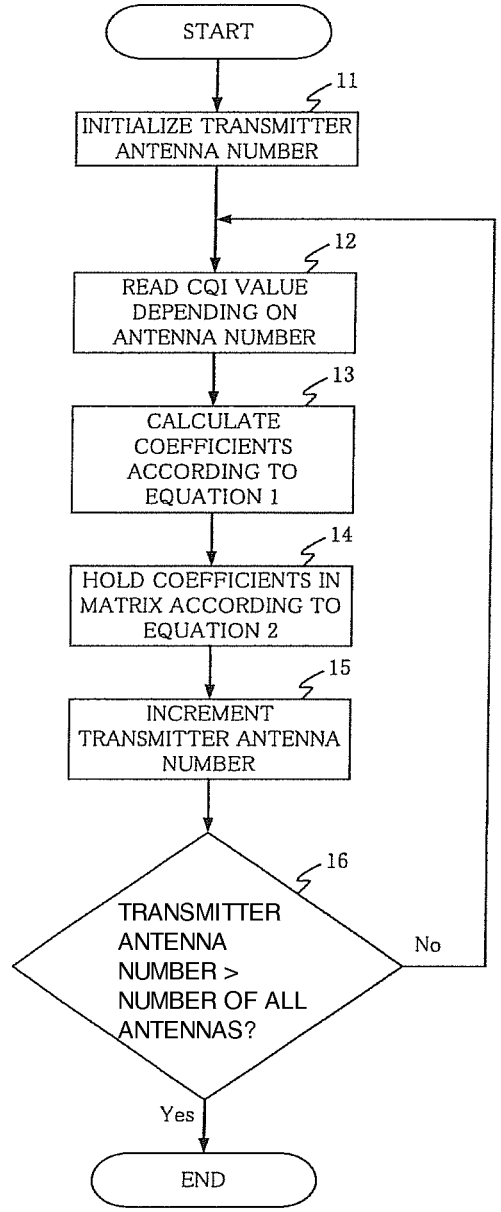

[Fig. 5]
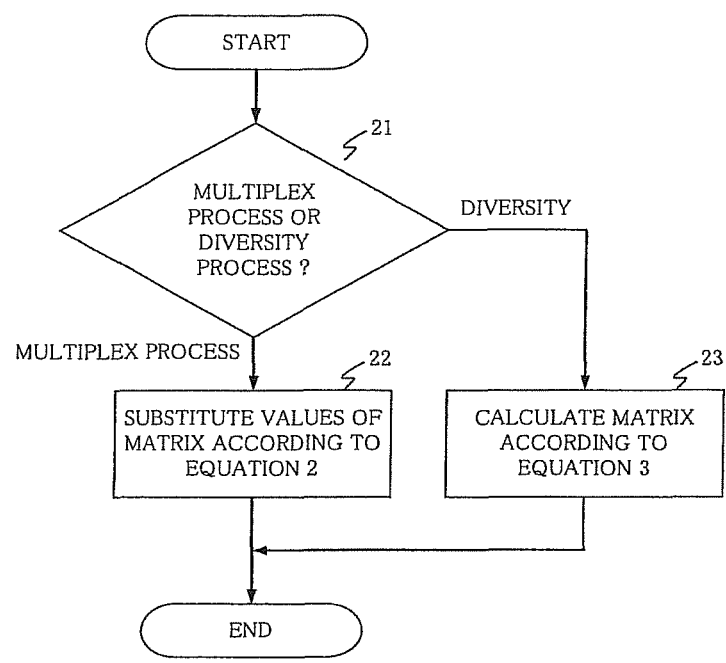

[Fig. 6]
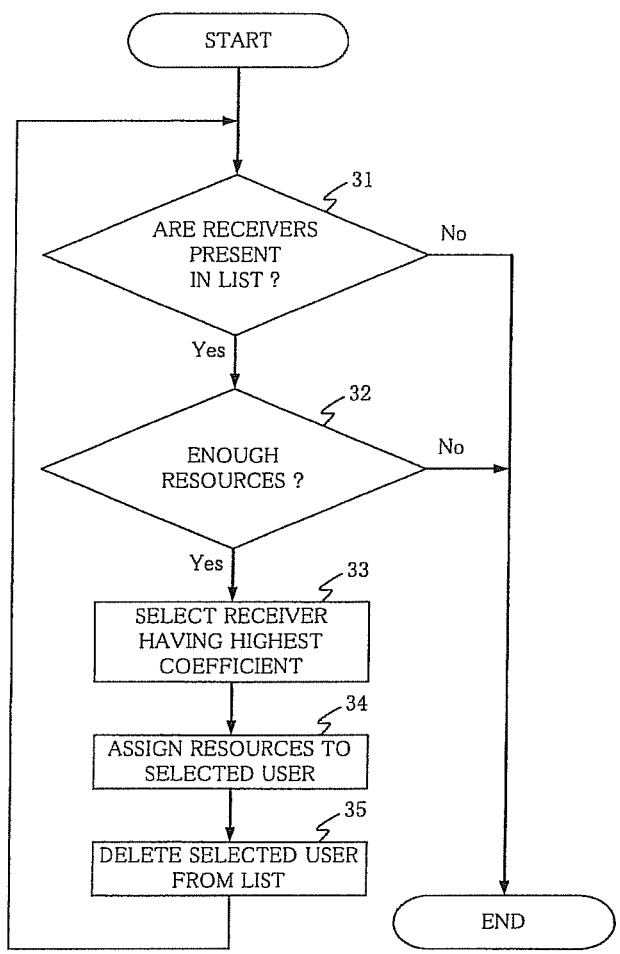

[Fig. 7]

| COEFFICIENT σ | Transport Block Size | HS-PDSCH CODE NUMBER | MODULATING PROCESS | Power Offset |
|---|---|---|---|---|
| 0 | NOT TRANSMITTED | | | |
| 1 | 137 | 1 | QPSK | 0 |
| ⋮ | | | | |
| 30 | 7168 | 5 | 16QAM | −8 |

MULTI-INPUT MULTI-OUTPUT COMMUNICATION SYSTEM, TRANSMITTER, AND METHOD OF ASSIGNING RESOURCES THEREIN

TECHNICAL FIELD

The present invention relates to a multi-input multi-output communication system for performing multi-input multi-output (MIMO) wireless communications based on the wireless technology, a transmitter, and a method of assigning resources in such a multi-input multi-output communication system and a transmitter.

BACKGROUND ART

With respect to the W-CDMA (Wideband Code Division Multiple Access) process according to the third generation partnership project (3GPP) which has been finding widespread usage in recent years, there has been proposed a HSDPA (High Speed Downlink Packet Access) process for realizing transmitting packets at high speeds in downlink, and research and development efforts have been made for the HSDPA process.

Research and development efforts have also been made for a multi-input multi-output (MIMO) communication process for transmitting data from a plurality of antennas of a transmitter and receiving the data with a receiver having a plurality of antennas. According to the multi-input multi-output communication process, each of the transmitter and the receiver has a plurality of antennas, and transmits or receives divided pieces of data simultaneously or parallel through the antennas for the purpose of increasing the transmission capacity, i.e., the throughput. The multi-input multi-output communication process is also applicable to a plurality of receivers each having a plurality of antennas. The multi-input multi-output communication process is considered to be a means for realizing services using the HSDPA process.

In order for a receiver having a plurality of antennas to properly receive transmitted data, there has been devised a method of measuring the reception quality of data transmitted from the transmitter and received by the receiver and performing transmission scheduling with the transmitter based on the measured reception quality (see, for example, PC(WO) No. 2004-535106).

According to the method disclosed in PC(WO) No. 2004-535106, however, transmission scheduling is performed based on only one of a plurality of reception qualities. The characteristics of the data received by the receiver tend to vary depending on which one of the plural reception qualities is used to perform transmission scheduling.

When resources to be assigned to antennas are established based on the reception quality representative of the propagation environment between a preset transmitter antenna and a preset receiver antenna, the data that are received by the receiver antenna based on which the reception quality has been measured are properly decoded. However, the data that are received by the other receiver antennas based on which the reception quality has not been measured are no properly decoded, and resources such as the number of codes and electric power are wasted for those other receiver antennas. As a result, radio wave interferences may be increased and the number of multiplex data may be reduced, the resources may not effectively be utilized, and an increased throughput, which is a feature of the multi-input multi-output communication process, may not be achieved.

DISCLOSURE OF THE INVENTION

It is an object of the present invention to provide a multi-input multi-output communication system which is capable of realizing an increased throughput, a transmitter, and a method of assigning resources in such a multi-input multi-output communication system and a transmitter.

To achieve the above object, there is provided in accordance with the present invention a multi-input multi-output communication system comprising a transmitter and a plurality of receivers each having a plurality of antennas for communicating with the transmitter, wherein the transmitter extracts CQI values representative of reception qualities, which are measured at the receivers and transmitted from the receivers, from data transmitted from the receivers and received by the transmitter, combines the extracted CQI values depending on preset weighting coefficients, calculates resource coefficients for assigning resources for transmitting data to the receivers from the combined CQI values, and assigns resources for transmitting data to the receivers based on the resource coefficients.

The transmitter comprises:

CQI extracting means for extracting CQI values representative of reception qualities, which are measured at the receivers and transmitted from the receivers, from data transmitted from the receivers and received by the transmitter;

coefficient calculating means for combining the extracted CQI values depending on preset weighting coefficients; and resource assigning means for calculating resource coefficients for assigning resources for transmitting data to the receivers from the combined CQI values, and assigning resources for transmitting data to the receivers based on the resource coefficients.

The transmitter comprises storage means for storing the resource coefficients and contents of resources to be assigned for transmitting data to the receivers, in association with each other.

There is also provided a transmitter for transmitting data to a plurality of receivers each having a plurality of antennas, wherein the transmitter extracts CQI values representative of reception qualities, which are measured at the receivers and transmitted from the receivers, from data transmitted from the receivers and received by the transmitter, combines the extracted CQI values depending on preset weighting coefficients, calculates resource coefficients for assigning resources for transmitting data to the receivers from the combined CQI values, and assigns resources for transmitting data to the receivers based on the resource coefficients.

The transmitter comprises:

CQI extracting means for extracting CQI values representative of reception qualities, which are measured at the receivers and transmitted from the receivers, from data transmitted from the receivers and received by the transmitter;

coefficient calculating means for combining the extracted CQI values depending on preset weighting coefficients; and resource assigning means for calculating resource coefficients for assigning resources for transmitting data to the receivers from the combined CQI values, and assigning resources for transmitting data to the receivers based on the resource coefficients.

The transmitter comprises storage means for storing the resource coefficients and contents of resources to be assigned for transmitting data to the receivers, in association with each other.

There is further provided a method of assigning resources in a multi-input multi-output communication system comprising a transmitter and a plurality of receivers each having a plurality of antennas for communicating with the transmitter, wherein the transmitter performs:

a process of extracting CQI values representative of reception qualities, which are measured at the receivers and transmitted from the receivers, from data transmitted from the receivers and received by the transmitter;

a process of combining the extracted CQI values depending on preset weighting coefficients, a process of calculating resource coefficients for assigning resources for transmitting data to the receivers from the combined CQI values; and a process of assigning resources for transmitting data to the receivers based on the resource coefficients.

According to the present invention thus arranged, the transmitter extracts CQI values representative of reception qualities measured by and transmitted from the receivers from data transmitted from the receivers and received by the transmitter, combines the extracted CQI values depending on preset weighting coefficients, calculates resource coefficients for assigning resources for transmitting data to the receivers from the combined CQI values, and assigns resources for transmitting data to the receivers based on the resource coefficients.

Consequently, it is possible to assign resources based on the CQI values measured respectively by the receivers each having a plurality of antennas, and the transmitter can appropriately and effectively utilizes the resources which the system has in its entirety depending on states between the transmitter and the receivers.

According to the present invention as described above, since the transmitter extracts CQI values representative of reception qualities measured by and transmitted from the receivers from data transmitted from the receivers and received by the transmitter, combines the extracted CQI values depending on preset weighting coefficients, calculates resource coefficients for assigning resources for transmitting data to the receivers from the combined CQI values, and assigns resources for transmitting data to the receivers based on the resource coefficients, the throughput can be increased.

BRIEF DESCRIPTION OF THE DRAWINGS

FIG. 1 is a diagram showing an exemplary embodiment of a multi-input multi-output communication system according to the present invention;

FIG. 2 is a diagram showing a configurational example of a transmitter shown in FIG. 1;

FIG. 3 is a flowchart illustrative of a process of calculating coefficients which is performed by a coefficient calculator;

FIG. 4 is a flowchart illustrative of the subroutine of step 2 in the flowchart shown in FIG. 3;

FIG. 5 is a flowchart illustrative of a process of determining matrix M1 according to Equation (2) depending on a communication process;

FIG. 6 is a flowchart illustrative of a resource assigning process performed by a resource assignor; and FIG. 7 is a diagram showing an example of contents of a table for associating resource coefficients and resources to be assigned.

BEST MODE FOR CARRYING OUT THE INVENTION

An exemplary embodiment of the present invention will be described below with reference to the drawings.

FIG. 1 is a diagram showing an exemplary embodiment of a multi-input multi-output communication system according to the present invention.

As shown in FIG. 1, the present exemplary embodiment comprises transmitter 101 and a plurality of receivers 102-1 through 102-$\beta$. Transmitter 101 has antennas 111-1 through 111-$\gamma$. Each of receivers 102-1 through 102-$\beta$ has antennas 121-1 through 121-$\varphi$. Data are transmitted and received between transmitter 101 and receivers 102-1 through 102-$\beta$ through the antennas.

FIG. 2 is a diagram showing a configurational example of transmitter 101 shown in FIG. 1.

As shown in FIG. 2, transmitter 101 shown in FIG. 1 comprises antennas 111-1 through 111-$\gamma$, transmitter/receiver 201, modulator/demodulator 202, multiplexer/demultiplexer 203, CQI extractor 204, coefficient calculator 205, resource assignor 206, and storage 207. FIG. 2 shows only those components which have a bearing on the present invention, among the components of transmitter 101.

Antennas 111-1 through 111-$\gamma$ transmit and receive radio waves to and from receivers 102-1 through 102-$\beta$ shown in FIG. 1. Transmitter/receiver 201 transmits and receives data to and from receivers 102-1 through 102-$\beta$ shown in FIG. 1 via antennas 111-1 through 111-$\gamma$. Modulator/demodulator 202 demodulates data received from receivers 102-1 through 102-$\beta$ via antennas 111-1 through 111-$\gamma$ by transmitter/receiver 201, and modulates data to be transmitted from transmitter/receiver 201 via antennas 111-1 through 111-$\gamma$ to receivers 102-1 through 102-$\beta$. Multiplexer/demultiplexer 203 multiplexes the data demodulated by modulator/demodulator 202 because those data are received via antennas 111-1 through 111-$\gamma$ by transmitter/receiver 201, and demultiplexes the data to be modulated by modulator/demodulator 202 because those data are to be transmitted from transmitter/receiver 201 via antennas 111-1 through 111-$\gamma$. CQI extractor 204 extracts CQI (Channel Quality Indicator) values representative of reception qualities from the data multiplexed by multiplexer/demultiplexer 203. The CQI values represent values measured by receivers 102-1 through 102-$\beta$ of the reception qualities of the data transmitted from transmitter 101 and received by receivers 102-1 through 102-$\beta$, and are fed back from receivers 102-1 through 102-$\beta$ to transmitter 101. Coefficient calculator 205 calculates coefficients for assigning resources for transmitting data to receivers 102-1 through 102-$\beta$ based on the CQI values extracted by CQI extractor 204. Resource assignor 206 assigns resources for transmitting data to receivers 102-1 through 102-$\beta$ based on the coefficients calculated by coefficient calculator 205. Storage 207 stores the CQI values extracted by CQI extractor 204, weighting coefficients used for coefficient calculator 205 to calculate coefficients, and contents of resource assignments depending on the coefficients calculated by coefficient calculator 205.

The number of CQI values fed back to transmitter 101 will be described below. Receivers 102-1 through 102-$\beta$ measure the respective reception qualities of the data transmitted from antennas 111-1 through 111-$\gamma$ of transmitter 101 and received thereby. Specifically, receiver 102-1, for example, measures as many CQI values as the number "γ×φ" where γ represents the number of antennas 111-1 through 111-γ of transmitter 101 and φ represents the number of antennas 121-1 through 121-φ of receiver 102-1, e.g., the CQI values of the reception qualities of the data transmitted from antenna 111-1 of transmitter 101 and received by antenna 121-1 of receiver 102-1, the data transmitted from antenna 111-2 of transmitter 101 and received by antenna 121-1 of receiver 102-1, the data transmitted from antenna 111-3 of transmitter 101 and received by antenna 121-1 of receiver 102-1, etc. Receivers 102-2 through 102-β similarly measure reception qualities. Since the measured reception qualities are fed back to transmitter 101, the number of CQI values fed back to transmitter 101 is represented by "γ×φ×β".

A resource assigning process in the multi-input multi-output communication system thus arranged will be described below. Of the resource assigning process, a process of calculating coefficients which is performed by coefficient calculator 205 shown in FIG. 2 will first be described below.

FIG. 3 is a flowchart illustrative of the process of calculating coefficients which is performed by coefficient calculator 205.

First, the inherent receiver numbers that are sequentially allotted to receivers 102-1 through 102-β are initialized in step 1. Specifically, the inherent receiver numbers are initialized to "1".

Thereafter, coefficients of the respective transmitter antennas are calculated in step 2.

FIG. 4 is a flowchart illustrative of the subroutine of step 2 in the flowchart shown in FIG. 3.

In step 2 shown in FIG. 3, the inherent transmitter antenna numbers that are sequentially allotted to antennas 111-1 through 111-γ of transmitter 101 are initialized in step 11 shown in FIG. 4. Specifically, the inherent transmitter antenna numbers are initialized to "1".

CQI values stored in storage 207 are read in step 12. At this time, the CQI values depending on the transmitter antenna number are read. The number of CQI values that are read is represented by "φ" which indicates the number of antennas 121-1 through 121-φ of receiver 102-1, as described above.

The "φ" CQI values that are read are substituted in Equation (1), calculating coefficient "Φ" in step 13.

$$\Phi = \frac{\sum_{i=1}^{\phi}\left(\rho_i \cdot 10^{\frac{CQI_i}{10}}\right)}{\sum_{i=1}^{\phi}\rho_i} \tag{1}$$

where "ρ" represents weighting coefficients for antennas 121-1 through 121-φ of receivers 102-1 through 102-β which are present in storage 207, and "i" the antenna numbers of receivers 102. In other words, the CQI values antennas 121-1 through 121-φ of receivers 102-1 through 102-β are combined depending on the weighting coefficients. Coefficient "Φ" calculated according to Equation (1) is held as "α" in matrix M1 according to Equation (2) in step 14.

$$M1 = \begin{bmatrix} \alpha_{11} & \cdots & \alpha_{1\gamma} \\ \vdots & & \vdots \\ \alpha_{\beta 1} & \cdots & \alpha_{\beta\gamma} \end{bmatrix} \tag{2}$$

Equation (2) represents a matrix of γ rows and β columns. For example, if the receiver number is "a" and the antenna number of transmitter 101 is "b", then its coefficients are held in an a-th row and a b-th column.

Thereafter, the antenna number is incremented by "1" in step 15. It is then determined in step 16 whether the incremented antenna number is greater than the number of all antennas 111-1 through 111-γ of transmitter 101 or not.

If it is judged that the incremented antenna number is greater than or equal to the number of all antennas 111-1 through 111-γ, then the subroutine for the transmitter antennas shown in FIG. 4 is ended, and control goes back to the process shown in FIG. 3.

If it is judged that the incremented antenna number is smaller than the number of all antennas 111-1 through 111-γ, then control goes back to step 12. In other words, Equation (1) is calculated for the number of antennas 111-1 through 111-γ, and the result is held in matrix M1 according to Equation (2).

After the subroutine for the transmitter antennas shown in FIG. 4 is ended, the receiver number is incremented by "1" in step 3. It is then determined in step 4 whether the incremented receiver number is greater than the number of receivers 102-1 through 102-β or not.

If it is judged that the incremented receiver number is greater than or equal to the number of receivers 102-1 through 102-β, then matrix M1 according to Equation (2) is completed, and the process is ended.

If it is judged that the incremented receiver number is smaller than the number of receivers 102-1 through 102-β, then control goes back to step 2. In other words, Equation (1) is calculated for the number of receivers 102-1 through 102-β, and the result is held in matrix M1 according to Equation (2).

When matrix M1 according to Equation (2) is completed, matrix M1 according to Equation (2) is converted depending on the current communication process.

FIG. 5 is a flowchart illustrative of a process of determining matrix M1 according to Equation (2) depending on a communication process.

When the process of calculating coefficients described with reference to FIGS. 3 and 4 is ended and matrix M1 according to Equation (2) is completed, it is determined in step 21 whether the current communication process is a multiplex process or a diversity process.

If it is judged that the current communication process is a multiplex process, then matrix M1 obtained according to Equation (2) is determined as matrix M in step 22.

If, on the other hand, it is judged that the current communication process is a diversity process, then matrix M1 obtained according to Equation (2) is converted according to Equation (3) in step 23.

$$M(\beta, 1) = \sum_{k=1}^{\gamma} M1(\beta, k) \tag{3}$$

where "k" represents the antenna number of transmitter 101. If it is judged that the current communication process is a diversity process, then since the number of antennas of transmitter 101 is 1, matrix M1 of γ rows and β columns according to Equation (2) is converted into matrix M of γ rows and 1 column according to Equation (3).

When matrix M is determined, resource assignor 206 determines resources to be assigned to receivers 102-1 through 102-β based on the coefficients of determined matrix M.

FIG. 6 is a flowchart illustrative of a resource assigning process performed by resource assignor 206.

It is determined in step 31 whether there are data to be transmitted or not. Receiver numbers awaiting data to be transmitted are registered in a list stored in storage 207. If it is judged that there are data to be transmitted, then receivers 102-1 through 102-β are listed as destinations.

If it is judged that there are no data to be transmitted, then the process is ended.

It is determined in step 32 whether transmitter 101 has enough resources (e.g., HS-PDSCH or HS-SCCH code number, device power, etc.) or not. If it is judged that transmitter 101 does not have enough resources, then the process for assigning resources for transmission at the TTI (transmission timing interval) is ended.

If it is judged that transmitter 101 has enough resources, then of receivers 102-1 through 102-β that are listed, receivers 102-1 through 102-β having the highest coefficient calculated according to the flowchart shown in FIG. 3 are selected in step 33, and resources depending on resource coefficients "σ" of selected receivers 102-1 through 102-β are assigned in step 34. Resource coefficients "σ" are calculated from the coefficients that are calculated according to Equations (1) through (3), according to Equation (4).

$$\sigma = 10 \cdot \log_{10} \alpha \quad (4)$$

where "α" represents coefficients which are the elements of matrix M calculated according to Equation (4). For example, if it is assumed that the current communication process is a diversity process, then resource coefficient "$\sigma_{11}$" for transmitting data from antenna 111-1 of transmitter 101 to receiver 102-1 is expressed by:

$$\sigma_{11} = 10 \cdot \log_{10} \alpha_{11} \quad (5)$$

Resource coefficient "$\sigma_{\beta\gamma}$" for transmitting data from antenna 111-γ of transmitter 101 to receiver 102-β is expressed by:

$$\sigma_{\beta\gamma} = 10 \cdot \log_{10} \alpha_{\beta\gamma} \quad (6)$$

Based on coefficients "σ" thus calculated, resources for transmitting data from antennas 111-1 through 111-γ of transmitter 101 to receivers 102-1 through 102-β are determined.

Resources to be determined have been stored in storage 207 in association with coefficients "σ".

FIG. 7 is a diagram showing an example of contents of a table for associating resource coefficients and resources to be assigned. Since the table stores coefficients "σ" as integral values in association with resources, digits after the decimal point of calculated coefficients "σ" are rounded up or truncated for use.

As shown in FIG. 7, coefficients "σ", Transport Block Sizes, HS-PDSCH code numbers, modulating processes, and Power Offdets are stored in association with each other. If coefficient "$\sigma_{11}$" is "0", then nothing is transmitted from antenna 111-1 of transmitter 101 to receiver 102-1. If coefficient "$\sigma_{21}$" is "1", then in order to transmit data from antenna 111-1 of transmitter 101 to receiver 102-2, resources such as Transport Block Size "137", HS-PDSCH code number "1", QPSK modulating process, and Power Offdet "0" are assigned.

When the assignment of resources is finished, selected receivers 102-1 through 102-β are deleted from the list in step 35. Control then goes back to step 31 for assigning resources with respect to receivers 102-1 through 102-β having the next highest coefficient.

As described above, since resources can be assigned based on coefficients calculated by combining all CQI values and weighting coefficients between antennas 111-1 through 111-γ of transmitter 101 and receivers 102-1 through 102-β, it is possible to assign appropriate resources in the entire system.

The invention claimed is:

1. A transmitter in a wireless communication system comprising:
    a transmission circuit configured to transmit, to a receiver, a plurality of control signals from a plurality of antennas of the transmitter, the transmitter having weights corresponding to the plurality of antennas of the receiver;
    a receiving circuit configured to receive, from said receiver, channel qualities which said receiver measures respective to plurality of antennas of said receiver;
    a coefficient calculator configured to calculate resource coefficients based on both said channel qualities and the weights corresponding to said plurality of antennas of the receiver, the weights corresponding to said plurality of antennas of the receiver being preset; and
    a resource assignor configured to determine at least modulation and a code scheme of a downlink channel based on said resource coefficient.

2. A control method in a transmitter of a wireless communication system, the control method comprising:
    transmitting, to a receiver, a plurality of control signals from a plurality of antennas of the transmitter, the transmitter having weights corresponding to the plurality of antennas of the receiver;
    receiving, from said receiver, channel qualities which said receiver measures respective to plurality of antennas of said receiver;
    calculating resource coefficients based on both said channel qualities and the weights corresponding to said plurality of antennas of the receiver, the weights corresponding to said plurality of antennas of the receiver being preset; and
    determining at least modulation and a code scheme of a downlink channel based on said resource coefficient.

3. A wireless communication system comprising:
    a receiver; and
    a transmitter having weights corresponding to a plurality of antennas of the receiver, a resource allocation unit, a coefficient calculation unit, and a transmission unit,
    wherein said coefficient calculation unit calculates resource coefficients by using both: channel qualities, which are measured at said receiver and transmitted from said receiver, for a plurality of control signals transmitted from plurality of antennas of said transmission unit in said transmitter to said receiver, and the weights corresponding to said plurality of antennas of the receiver, the weights corresponding to said plurality of antennas of the receiver being preset, wherein said resource allocation unit determines at least modulation and a code scheme of a downlink channel based on said resource coefficient.

* * * * *